United States Patent
Bauer et al.

(10) Patent No.: US 9,672,347 B2
(45) Date of Patent: Jun. 6, 2017

(54) INTEGRITY FOR SECURITY AUDIT LOGS

(71) Applicants: Uwe Bauer, Weinsberg (DE); Juergen Kremp, Walldorf (DE)

(72) Inventors: Uwe Bauer, Weinsberg (DE); Juergen Kremp, Walldorf (DE)

(73) Assignee: SAP SE, Walldorf (DE)

( * ) Notice: Subject to any disclaimer, the term of this patent is extended or adjusted under 35 U.S.C. 154(b) by 41 days.

(21) Appl. No.: 14/567,030

(22) Filed: Dec. 11, 2014

(65) Prior Publication Data

US 2016/0171205 A1    Jun. 16, 2016

(51) Int. Cl.
G06F 21/00    (2013.01)
G06F 21/44    (2013.01)
G06F 9/54     (2006.01)
G06F 21/64    (2013.01)

(52) U.S. Cl.
CPC ............. G06F 21/44 (2013.01); G06F 9/542 (2013.01); G06F 21/64 (2013.01)

(58) Field of Classification Search
CPC . H04L 9/3236; H04L 9/3247; H04L 2209/38; G06F 21/602; G06F 2221/2101; G06F 21/64
See application file for complete search history.

(56) References Cited

U.S. PATENT DOCUMENTS

| | | | |
|---|---|---|---|
| 5,956,404 A * | 9/1999 | Schneier | G06Q 20/401 380/30 |
| 5,978,475 A * | 11/1999 | Schneier | G06F 21/6209 713/164 |
| 6,367,013 B1 * | 4/2002 | Bisbee | G06Q 20/00 713/158 |
| 6,868,406 B1 * | 3/2005 | Ogg | G07B 17/00193 705/401 |
| 6,968,456 B1 * | 11/2005 | Tripathi | G06F 21/64 707/999.009 |
| 8,230,228 B2 * | 7/2012 | Hahn | G06F 21/64 713/176 |
| 8,316,240 B2 * | 11/2012 | Graziani | G06F 21/64 713/189 |
| 8,792,638 B2 | 7/2014 | Kremp | |
| 2004/0267668 A1 * | 12/2004 | Aissi | G06F 21/60 705/50 |
| 2005/0234909 A1 * | 10/2005 | Bade | G06F 21/552 |
| 2007/0043948 A1 * | 2/2007 | Bugbee | H04L 9/3247 713/176 |
| 2008/0104407 A1 * | 5/2008 | Horne | G06F 21/64 713/178 |
| 2009/0016534 A1 * | 1/2009 | Ortiz Cornet | G06F 21/64 380/277 |

(Continued)

OTHER PUBLICATIONS

"Hard-Coding" Wiki article retrieved from Wayback Machine Mar. 2, 2012.*

Primary Examiner — Farid Homayounmehr
Assistant Examiner — Christopher C Harris
(74) Attorney, Agent, or Firm — Fish & Richardson P.C.

(57) ABSTRACT

Methods, systems, and computer-readable storage media for storing event data in an audit log file. Implementations include actions of receiving event data, determining a first signature based on the event data and an end marker, and appending the event data and the first signature to the audit log file, the first signature comprising at least a portion of a signature chain associated with the audit log file.

17 Claims, 7 Drawing Sheets

(56) References Cited

U.S. PATENT DOCUMENTS

| | | | |
|---|---|---|---|
| 2009/0199301 A1* | 8/2009 | Chandrasekaran | G06F 17/30286 726/27 |
| 2009/0228701 A1* | 9/2009 | Lin | H04L 9/083 713/155 |
| 2009/0319405 A1* | 12/2009 | Kawai | G06F 17/30949 705/30 |
| 2010/0115284 A1* | 5/2010 | Hahn | G06F 21/64 713/179 |
| 2011/0041180 A1* | 2/2011 | Jakobsson | G06F 21/56 726/23 |
| 2011/0314297 A1* | 12/2011 | Jakobsson | G06F 21/64 713/189 |
| 2012/0239935 A1* | 9/2012 | Osborne | H04L 9/3247 713/176 |
| 2015/0188715 A1* | 7/2015 | Castellucci | H04L 9/3265 713/178 |

* cited by examiner

INTEGRITY FOR SECURITY AUDIT LOGS

BACKGROUND

Audit logs can be provided to record events that occur during execution of one or more computer-executable applications. In some examples, an audit log is provided as a computer-readable/-writable file, which includes data for each event of a plurality of events. An audit log enables an auditor to audit the execution of an application. In some examples, the integrity of an audit log file can be compromised. For example, an audit log can be corrupted (e.g., one or more errors in the stored data), and/or manipulated or spoofed (e.g., by a malicious user).

SUMMARY

Implementations of the present disclosure include computer-implemented methods for enhancing an integrity of an audit log file. In some implementations, actions include receiving event data, determining a first signature based on the event data and an end marker, and appending the event data and the first signature to the audit log file, the first signature comprising at least a portion of a signature chain associated with the audit log file. Other implementations of this aspect include corresponding systems, apparatus, and computer programs, configured to perform the actions of the methods, encoded on computer storage devices.

These and other implementations can each optionally include one or more of the following features: the first signature is provided as an authentication code; the first signature is further based on a hash of the event data and a random initialization vector; the first signature is further based on a hash of the event data and a hash of previously appended event data; actions further include determining a second signature based on the event data, and overwriting the first signature with the second signature in the audit log file; the second signature is provided as an authentication code; and the second signature is further based on a hash of the event data and a random initialization vector.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to enhancing integrity of a security audit log. More particularly, implementations of the present disclosure are directed to ensuring consistency and integrity of an audit log file during evaluation, and enabling detection of technical corruption, manipulation and/or spoofing. In some examples, the audit log file is provided as a file, to which events are sequentially written. Implementations of the present disclosure include a modification to the audit log file structure and of the audit write process. In some implementations, the security audit log file includes a chain of signatures, where a signature is constructed with data used in a previous signature.

Implementations of the present disclosure will be described in detail with reference to an example context. The example context is directed to an example platform that selectively stores event data in one or more audit log files. It is contemplated, however, that implementations of the present disclosure can be used in any appropriate context.

In accordance with the example context, the example platform provides one or more applications and one or more databases to provide functionality to users. An example platform includes an enterprise resource planning platform (ERP) that enables an enterprise (e.g., a company) to manage resources (e.g., assets, personnel, financials, etc.). In some examples, a user can log into the platform, or an application of the platform (e.g., by providing credentials) and can perform one or more actions (e.g., order goods). In some examples, events occurring on the platform can be recorded in an audit log file. In some examples, the audit log file is provided as a computer-readable/-writable file, which includes data for each event of a plurality of events. Example events can include, but are not limited to, a user log-in/-out, and execution of an action.

In some examples, event data is recorded in the audit log file in response to occurrence of an event. For example, for a user log-in to an application, a user identifier associated with the user (e.g., an identifier that uniquely identifies the user from a plurality of users), an application identifier associated with the application (e.g., an identifier that uniquely identifies the application from a plurality of applications of the platform) and a time of the log-in can be provided as event data. As another example, for a user log-out, the user identifier, the application identifier and a time of the log-out can be provided as event data. As another example, for an action execution (e.g., ordering goods), the event data can include the user identifier, the application identifier, a time that the action was executed and any appropriate information associated with the action (e.g., a type of good, a quantity of goods, an identifier assigned to a vendor, from which the goods were ordered, etc.).

Figure 1:
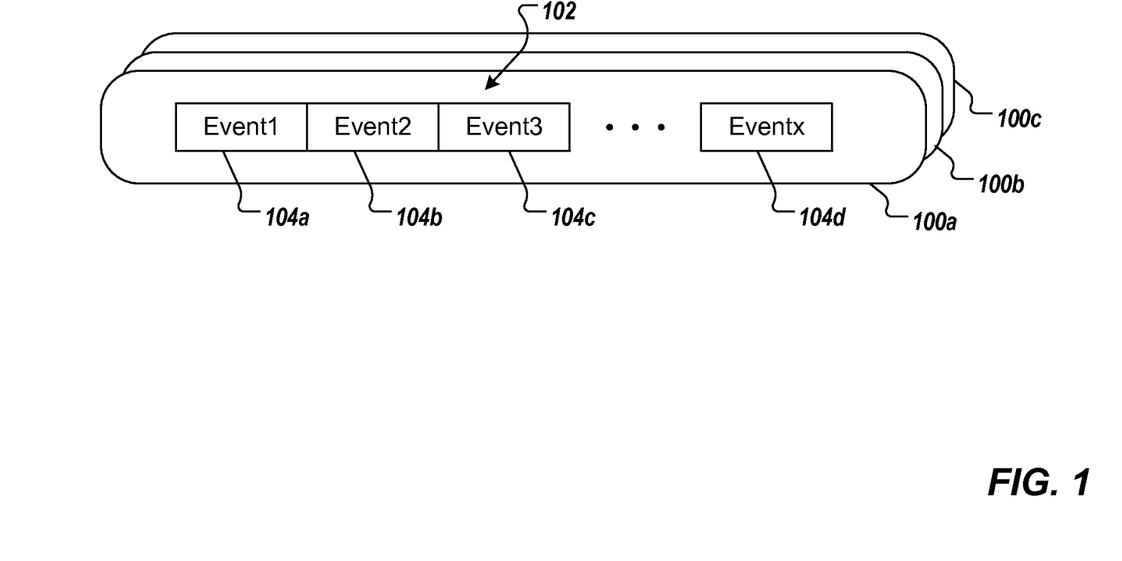
FIG. 1 depicts an example structure of an audit log file.

FIG. 1 depicts an example structure of an audit log file. More particularly, the audit log file of FIG. 1 represents a traditional file structure that is susceptible to compromised file integrity. In the example of FIG. 1, a plurality of audit log files 100a, 100b, 100c are provided. With reference to the audit log file 100a, event data 102 is recorded and includes a series of events 104a, 104b, 104c, 104d. In some examples, the events 104a, 104b, 104c, 104d are written as an appended text string having a fixed record size. That is, events are written to the audit log file 100a until a maximum file size is achieved.

In an example context, all work processes of a single platform instance write to a single audit log file. It is contemplated, however, that implementations of the present disclosure can be provided in any appropriate context (e.g., for sequentially writing events to an audit log file). In some examples, a lock (e.g., a semaphore lock) is used to serialize parts of the write procedures of the work processes. For example, the lock can be set until a file position pointer (e.g., located in shared memory) is actualized. In some examples, a currently open audit log file is closed and a new audit log file is opened in response to a day change occurrence (e.g., a 24 hour clock has expired). In some examples, when the platform instance is stopped and started again, the first work process searches for the end of the audit log file that is open for writing events to, and event data from the work process is appended to the end of the open audit log file. This is repeated until a pre-defined maximum audit log file size is achieved. If the pre-defined maximum audit log file size is achieved, the audit log file is closed and no more events are logged to that audit log file. In some examples, another audit log file can be opened, and logging can continue. In some examples, a pre-defined maximum overall size can be provided, such that, if the pre-defined maximum overall size file is achieved (e.g., for a given 24 hour period) logging events to audit log files is stopped.

The example, traditional audit log file structure of FIG. 1 is susceptible to compromise of file integrity. More specifically, manipulation or spoofing of a complete audit log file is possible (e.g., as long as the same structure is used). Further, technical corruption of the event data cannot be detected (e.g., as long as the structure itself is not corrupted).

In view of this, implementations of the present disclosure enhance integrity of audit log files. More particularly, implementations of the present disclosure are directed to ensuring consistency and integrity of audit log files, and enabling detection of technical corruption, manipulation and/or spoofing. Implementations of the present disclosure include a modification to the audit log file structure (e.g., of FIG. 1) and of the audit write process (e.g., the process of writing event data to the audit log file). In accordance with the present disclosure, a audit log file structure is provided, which includes a chain of signatures, where a signature is constructed with data used in a previous signature. In some examples, a signature is provided as a Hash-based Message Authentication Code (HMAC) of data. Although implementations of the present disclosure will be described with reference to HMAC, it is contemplated that implementations of the present disclosure can include any appropriate mechanism.

In some implementations, the audit log file is written in a structure referred to as an integrity protection format (IPF) structure. In some examples, the Audit log file is written in a platform-independent code page using a predefined encoding (e.g., Universal Character Set+Transformation Format 8-bit (UTF-8)). In some implementations, the audit log file includes a header and one or more audit log entries. In some examples, the header is static. That is, once the header is created, the information captured in the header is not changed by the platform. In some examples, each audit log entry corresponds to an event and audit log entries are appended to the audit log files as respective events occur, as described in further detail herein.

In some implementations, the header includes plurality of fields, each field having a fixed size. Example fields of the header include a version number ("Vers"), a key identifier ("HMAC Ident"), and a random initialization vector ("Random IV"). In some examples, the version number indicates a version of the audit log file structure that is implemented for the audit log file. In some examples, the key identifier is provided as a string and indicates the key used to calculate the signatures, as described in further detail herein. In some examples, the key identifier is limited to a maximum number of characters (e.g., 36 characters). In some implementations, the key is a secret, cryptographic key that is used to calculate a signature (e.g., HMAC), and is stored by the platform in secure storage. In some examples, the random initialization vector is provided as a pseudo-random value having a fixed length. In some examples, the random initialization vector is limited to a maximum size (bytes) (e.g., 64 characters).

In some implementations, each audit log entry corresponds to an event and includes a plurality of elements. Example elements include event data (e.g., the data underlying the event) and a signature. In some examples, the signature is based on a hash value of an entry immediately preceding the respective audit log entry. In some examples, the signature is provided as a standard hash algorithm (SHA) HMAC (e.g., SHA-256 HMAC) of a SHA hash (e.g., SHA-256) of the immediately preceding audit log entry. In some examples, the signature for the first event included in the audit log file is based on the random initialization vector provided in the header, as described in further detail herein. In some examples, the signature for the last event included in the audit log file is based on the immediately preceding audit log entry and an end marker, as described in further detail herein. In some examples, the end marker is provided as a hard-coded string, and makes it infeasible for an attacker to trim the audit log file to let data disappear unnoticed.

Implementations of the audit log file structure of the present disclosure provide security improvements. In one example, the audit log file structure of the present disclosure enables detection of technical corruption of the audit log file itself, and/or event data within the audit log file. As another example, the audit log file structure of the present disclosure enables detection of manipulation of the audit log file and event data within the audit log file, and/or spoofing.

In some implementations, the level of security provided can vary. More specifically, implementations of the present disclosure can provide a first mode of security and a second mode of security. In some examples, the first mode provides improved security than that, which can be achieved using traditional audit log file structures, such as that described above with reference to FIG. 1. In some examples, the first mode enables detection of whether technical corruption is present (e.g., based on consistency checking), but does not enable detection of manipulation and/or spoofing. In some examples, the second mode provides improved security relative to the first mode. In some examples, the second mode enables detection of whether technical corruption is present, as well as detection of manipulation and/or spoofing.

In some implementations, the mode is provided based on the key (e.g., HMAC key) that is used. In some examples, if a key is not already provided (e.g., stored in secure storage), a default key used. This results in the respective audit log file being secure in the first mode. In some examples, the key identifier of the default key is provided as a hardcoded value. If, however, a key is provided (e.g., a HMAC key is generated and saved in secure storage, or is otherwise available from the secure storage), the key is used. This results in the respective audit log file being secure in the second mode (e.g., without knowledge of the key, an attacker can neither change the content of the audit log file, nor trim the audit log file without being detected).

In view of the audit log file structure provided by the present disclosure, implementations of the present disclosure also provide a process for creating and writing to an audit log file. Each work process of a single platform instance writes to a single audit log file. That is, a single audit log file is provided for all work processes to write to (e.g., until a maximum file size is achieved, or a 24 hour clock has expired). In some examples, the work processes are serialized by a lock (e.g., semaphore lock), and the pointer indicating where event data is to be written in the current audit log file is stored in shared memory ("SHM"). In some examples, the SHM is accessible by all work processes of the platform. In accordance with implementations of the present disclosure, an authentication code (e.g., HMAC) and a hash of the last written entry are stored in the SHM.

In some implementations, the write of the first event data to the audit log file results in a signature that is based on the random initialization vector, a hash of the first event data, and an end marker. In some examples, a hash is a value that maps data of arbitrary length to data of a fixed length. The signature is appended to the end of the audit log file, after the event data. Further, the hash of the event data, a signature based on the random initialization vector and the event data are stored in the SHM. In some implementations, and as described in further detail herein, each subsequent write of an audit log entry includes overwriting the signature of the previous audit log entry in the audit log file, appending the authentication code from the SHM, writing the event data to the audit log file, and providing a new signature, which includes the end marker, at the end of the audit log file. Further, the SHM is updated with a new hash and the new signature without the end marker.

In some implementations, the lock is set for multiple tasks, as well as writing and overwriting. Implementations of the present disclosure provide the following example sequence: event data that is to be written to the audit log file is converted to an appropriate format (e.g., UTF-8); a hash of the event data (the converted event data) is calculated; the lock is engaged; the position of where to write the event data in the audit log file is determined (e.g., based on the pointer position), a previous hash and a previous authentication code are received (e.g., from the SHM); a first signature (for the to-be-written event data) is calculated with the end marker; a second signature (for the to-be-written event data) is calculated without the end marker; the signature at the end of the audit log file is overwritten with a previous signature, which was calculated without the end marker, received from the SHM; the event data (the converted event data) is appended to the audit log file after the previous signature; the first signature is appended to the audit log file after the event data; the pointer position is updated; the hash, the second signature, and the pointer position are stored in the SHM; and the lock is released. This example sequence is described in further detail below with reference to FIGS. 2A-2D.

Figure 2A:
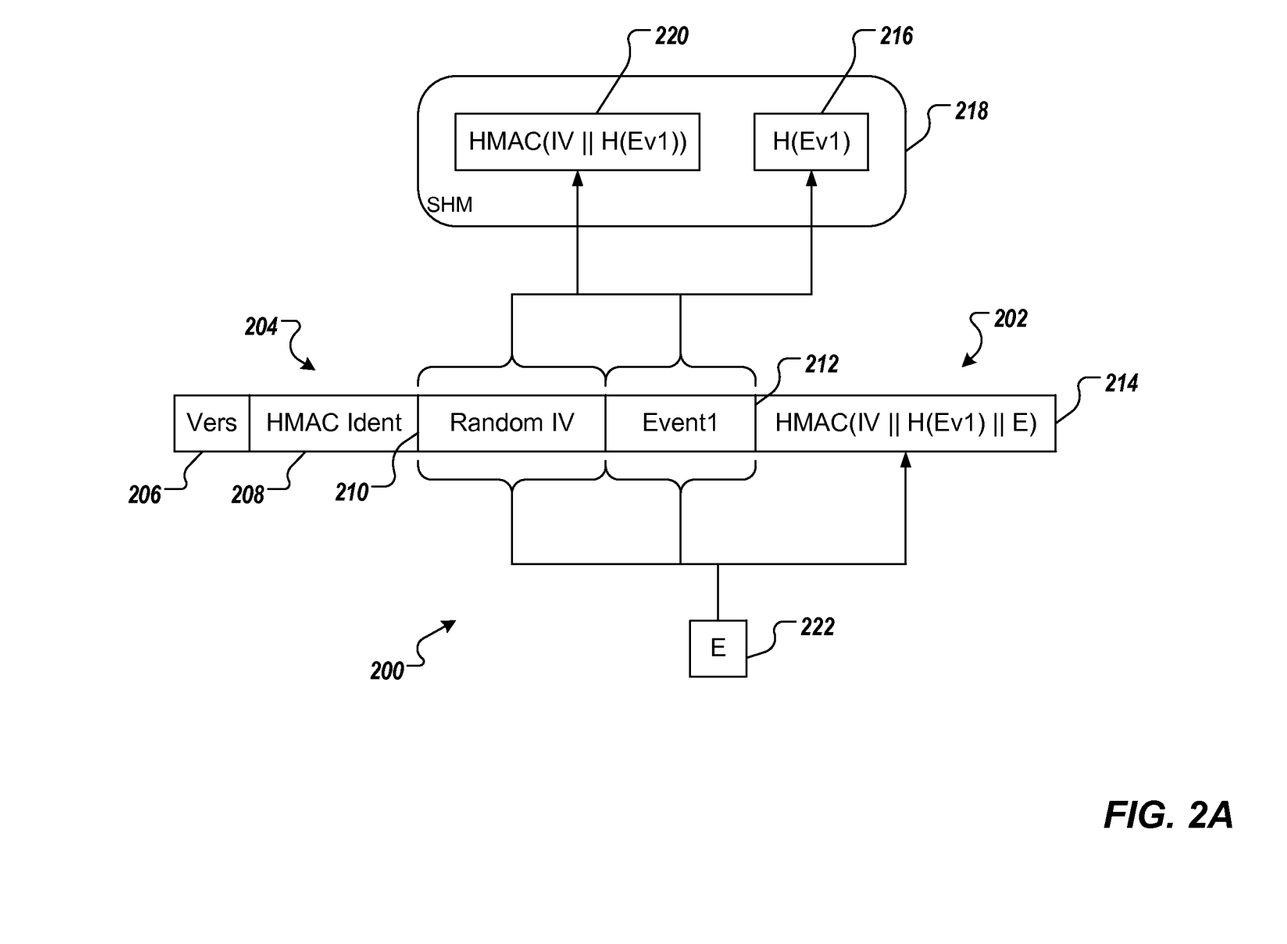
FIGS. 2A-2D depict an audit log file and write process in accordance with implementations of the present disclosure.

FIGS. 2A-2D depict an audit log file 200 and write process in accordance with implementations of the present disclosure. FIG. 2A depicts writing of a first audit log entry 202 to the audit log file 200. In the example of FIG. 2A, the audit log file 200 includes a header 204, which is provided upon creation of the audit log file 200. The header 204 includes a version 206, a key identifier 208, and a random initialization vector 210.

In some implementations, the event data that is to be written to the audit log file 200 is converted to an appropriate format (e.g., UTF-8) to provide first event data 212. A hash 216 of the first event data 212 is calculated. The lock is engaged, and a position of where to write the first event data 212 in the audit log file 200 is determined. In the example of FIG. 2A, the position is at the end of the header 204. A signature 212 is calculated based on the random initialization value 210, the hash 216 and an end marker 222. In some examples, the signature 214 is provided as an HMAC of a concatenation of the random initialization value 210, the hash 216 and an end marker 222. A signature 220 is calculated based on the random initialization value 210 and the hash 216. In some examples, the signature 220 is provided as an HMAC of a concatenation of the random initialization value 210 and the hash 216. The first event data 212 is appended to the audit log file 200 after the header 204, and the signature 214 is appended to the audit log file 200 after the first event data 212. The pointer position is updated (e.g., to point to the end of the signature 214. The hash 216, the signature 220, and the pointer position are stored in a SHM 218, and the lock is released.

Accordingly, the first audit log entry 202 includes the first event data 212 and the signature 214, and FIG. 2A depicts the state of the audit log file 200 and items stored in the SHM 218 after the first audit log entry 202 is written to the audit log file 200.

Figure 2B:
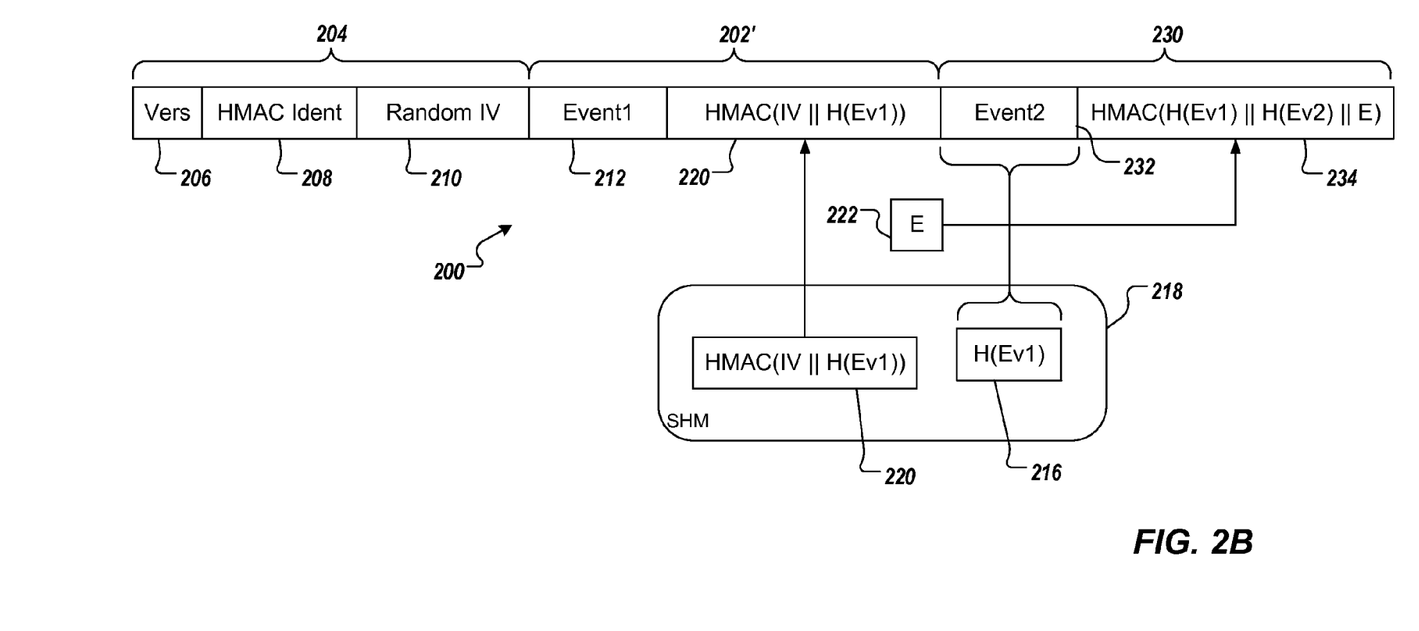
Figure 2C:
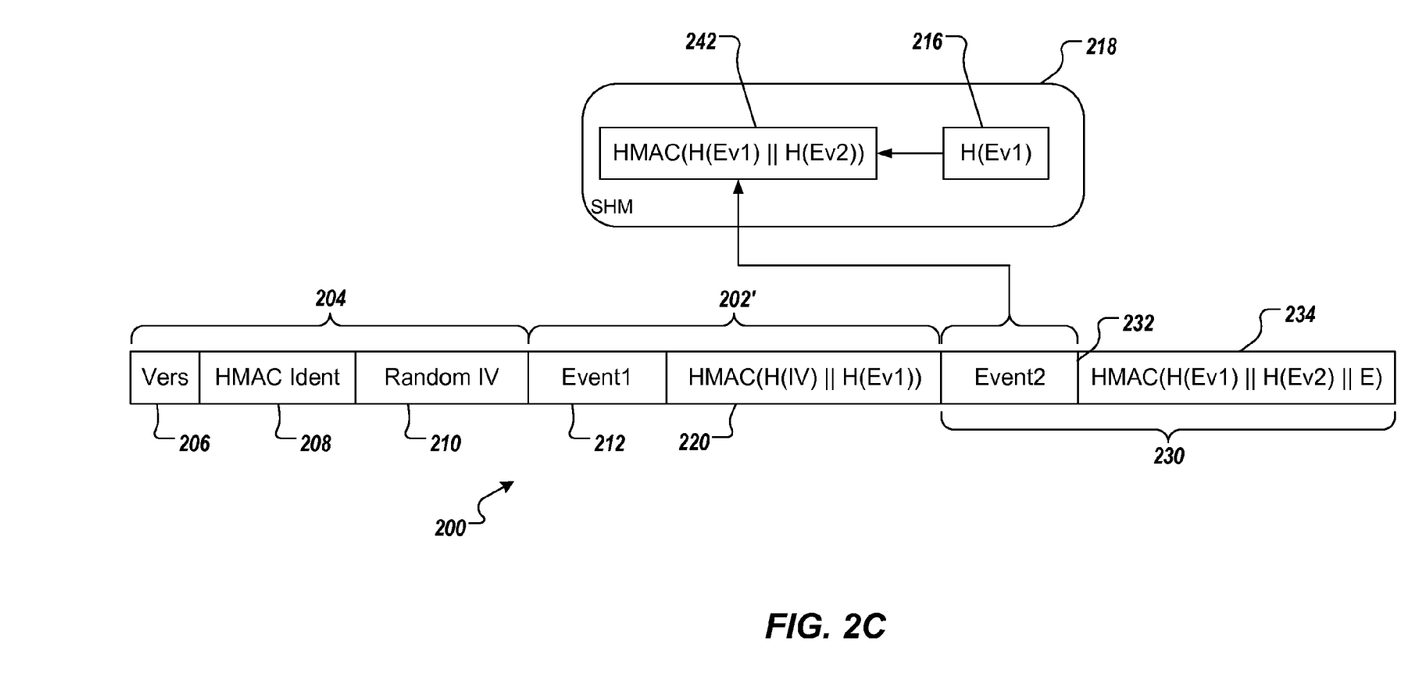
Figure 2D:
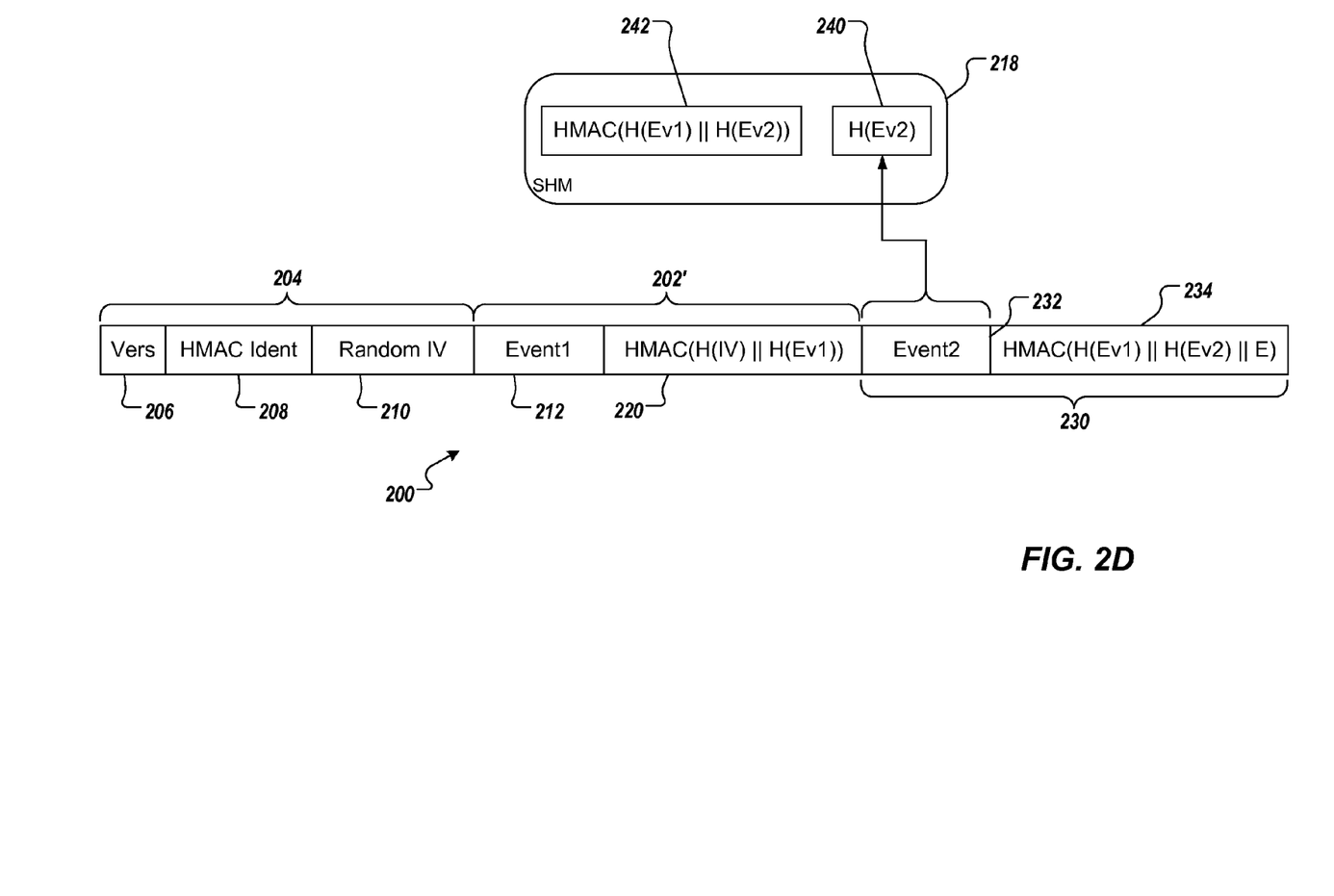

FIGS. 2B-2D depict writing of a second audit log entry 230 to the audit log file. In some implementations, the event data that is to be written to the audit log file 200 is converted to an appropriate format (e.g., UTF-8) to provide second event data 232. A hash 240 (see FIG. 2D) of the second event data 232 is calculated. The lock is engaged, and a position of where to write the second event data 232 in the audit log file 200 is determined (e.g., from the SHM 218). In the example of FIGS. 2B-2D, the position is at the end of the first event data 212. A signature 234 is calculated based on the hash 216, the hash 240 and the end marker 222. In some examples, the signature 234 is provided as an HMAC of a concatenation of the hash 216, the hash 240 and the end marker 222. A signature 242 (see FIGS. 2C and 2D) is calculated based on the hash 216 and the hash 240. In some examples, the signature 242 is provided as an HMAC of a concatenation of the hash 216 and the hash 240. The second event data 232 is appended to the audit log file 200 after the first audit log entry 202', and the signature 234 is appended to the audit log file 200 after the second event data 232. The pointer position is updated (e.g., to point to the end of the signature 234. The hash 240, the signature 242, and the pointer position are stored in a SHM 218, and the lock is released.

Accordingly, FIG. 2B depicts the state of the audit log file 200 after the second audit log entry 230 is written to the audit log file 200. FIGS. 2C and 2D depict updating of the items stored in the SHM 218 as a result of writing of the second audit log entry 230 to the audit log file 200. In some examples, the signature 220 (see FIGS. 2A and 2B) is deleted from the SHM 218. In some examples, the hash 216 of the first event data 212 is deleted from the SHM 218. In some examples, the signature 242 and the hash 240 are used to write third event data to the audit log file 200, as similarly described herein for writing the second event data 232 to the audit log file 200.

In accordance with implementations of the present disclosure, the integrity of an audit log file can be checked. In some examples, the signature chain of the audit log file is re-calculated using the key (e.g., stored in secure storage). For example, the key used for the particular audit log file is determined based on the key identifier included in the header of the audit log file, and the key is retrieved from the secure storage. The key is used along with the random initialization vector and the event data to calculate an expected signature for each audit log entry. In this manner, an expected signature chain is provided. The expected signature chain can be compared to the actual signature chain of the audit log file. If the expected signature chain and the actual signature chain are identical, it is determined that the integrity of the audit log file is intact. If the expected signature chain and the actual signature chain are not identical, it is determined that the integrity of the audit log file has been compromised. In some implementations, the integrity check can be used to determine the last correct entry in a corrupted or manipulated file.

In some implementations, a subsequent check of an already successfully checked audit log file can be made more efficient (e.g., faster). In some examples, an audit log file signature can be provided based on the signature chain of the respective audit log file. In some examples, the audit log file signature is provided as an HMAC based on a concatenation of the signatures in the signature chain using the same HMAC key. The audit log file signature can be stored (e.g., in a separate database table) as an expected audit log file signature for the respective audit log file. In some examples, if the integrity of the audit log file is to again be checked, an actual audit log file signature can be determined based on the signature chain. In this manner, performance is increased, because an actual signature chain based on each audit log entry need not be determined. The actual audit log file signature can be compared to the expected audit log file signature (e.g., retrieved from memory for the respective audit log file). If the actual audit log file signature matches the expected audit log file signature, the integrity of the audit log file is intact. If the actual audit log file signature does not match the expected audit log file signature, the integrity of the audit log file has been compromised. In some examples, if it is determined that the integrity of the audit log file has been compromised, an actual signature chain of the audit log file can be determined and can be sued to identify the corrupted, manipulated or spoofed event data.

In accordance with implementations of the present disclosure, an attacker (malicious user) that has access to the audit log files is not able to modify an existing audit log file without detection. However, the attacker could remove the entire audit log file. To detect this type of manipulation, some implementations store metadata of each audit log file (e.g., in a database table). Example metadata includes, but is not limited to, filename, creation date, and the random initialization vector and the key identifier of the audit log file. For any given timeframe, a comparison between the list of audit log files that should be present (e.g., based on the metadata stored in the database table) the list of audit log files that are present enables identification of any missing audit log file. In some examples, the comparison routine can include obtaining the random initialization vector and the key identifier for every audit log file that is to be read, and determining whether all audit log files of the relevant date were taken into account by, for example, using the random initialization vectors as identifiers and looking the respective audit log files up in the database table. If all random initialization vectors for a date in database table were also processed during evaluation, it is determined that no audit log files were deleted.

In some examples, a user can copy audit log files to other systems and evaluate the audit log files there without needing to convert the audit log files. This is because, for example, the audit log files of the present disclosure are written using UTF-8 code. In this manner, the audit log files can be moved to another system, and the integrity check can be performed there. That is, because conversion between codes is not required, the copied audit log files are consistent with the original audit log files. Conversion would result in inconsistencies between the copied audit log files and the original audit log files, making an integrity check unable to be performed (e.g., the integrity check would indicate compromised integrity in all cases, even if the integrity had not actually been compromised).

In some implementations, a secret can be used as the key (e.g., HMAC key), instead of the built-in hardcoded key. In such cases, and if the audit log file is to be copied to another system for evaluation, the key must also be transferred to the evaluating system. For such cases, implementations of the present disclosure enable secure downloading of the key from the source system and to the evaluation system. In some implementations, a transport container is provided by: deriving a symmetric key based on a passphrase and a random salt; encrypting the key identifier and the key using the symmetric key; providing the transport container including the salt and the encrypted data (key identifier and key); decorating the data with a magic value (e.g., providing a dedicated string at the beginning of the file, which indicates the purpose of the file (audit log)) and the key identifier in clear text to provide optical recognize ability; and providing a default filename for the container that includes the key identifier (e.g., for documentary reasons). In some examples, the symmetric key is derived using Password-Based Key Derivation Function 2 (PBKDF2) (a function that repeatedly applies a cryptographic hash function to a passphrase to produce a cryptographic key.

In some examples, during upload of a transport container the passphrase is provided, the symmetric key is derived and the key identifier and key are decrypted with the symmetric key and are stored in secure storage of the evaluation system. In accordance with implementations of the present disclosure, it is not possible to activate any uploaded key as an active key. In some examples, the active key is the key used to produce signatures of the system. Although other keys can also exist in the secure storage, such keys might only serve the purpose of checking the integrity of audit log files produced, for example, by other systems (e.g., a central system is used as a log-evaluation system for multiple systems producing logs). By preventing any uploaded key from being activated as the active key, a system is unable to impersonate another system. Accordingly, only a key that has been generated by the system itself can be used to produce audit log files of that system.

Figure 3:
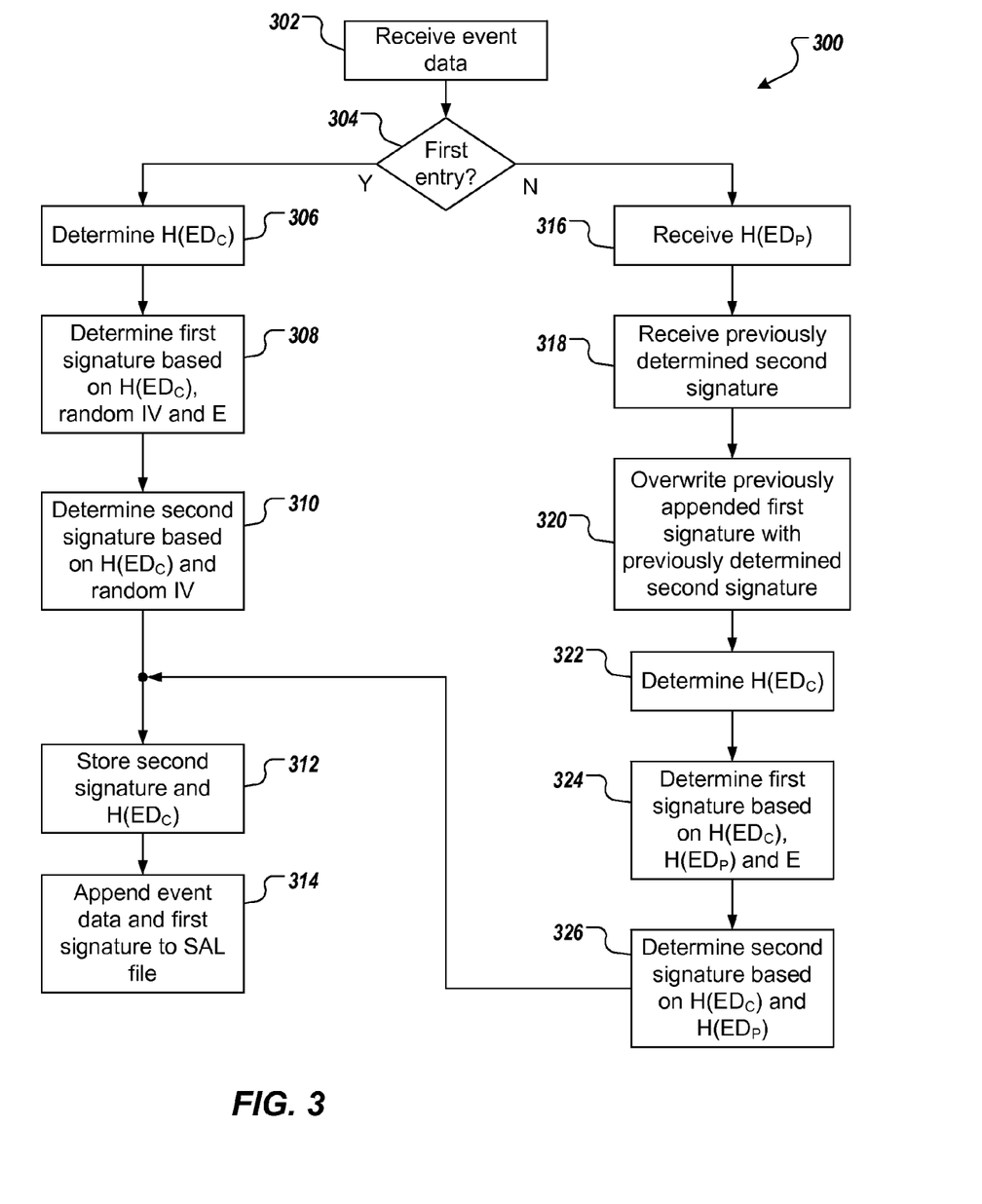
FIG. 3 depicts an example process that can be executed in accordance with implementations of the present disclosure.

FIG. 3 depicts an example process 300 that can be executed in accordance with implementations of the present disclosure. In some examples, the example process 300 can be provided by one or more computer-executable programs executed using one or more computing devices.

Event data is received (302). For example, it can be determined that an event has occurred, for which event data is to be written to an audit log file, and the event data can be provided for writing to the audit log file. In some examples, the event data that is to-be-written to the audit log file is referred to as the current event data ($ED_C$) (e.g., Ev1 of FIG. 2A). It is determined whether the event data will be provided as the first audit log entry of the audit log file (304). For example, a pointer position can be determined and can point to an end of a header of the audit log file.

If it is determined that the event data will be provided as the first audit log entry of the audit log file, a hash of the current event data ($H(ED_C)$) is determined (306). A first signature is determined based on the $H(ED_C)$, a random initialization vector (IV) provided in the header and an end marker (308). For example, the first signature can be provided as an HMAC based on a concatenation of the random initialization vector IV, the $H(ED_C)$, and the end marker. A second signature is determined based on the $H(ED_C)$ and the random IV (310). For example, the second signature can be provided as an HMAC based on a concatenation of the random IV and the $H(ED_C)$.

The second signature and the $H(ED_C)$ are stored (312). For example, second signature and the $H(ED_C)$ are stored in shared memory (e.g., the SHM 218 of FIGS. 2A-2D). The current event data and the first signature are appended to the end of the audit log file (314).

If it is determined that the event data will not be provided as the first audit log entry of the audit log file, a hash of a previously appended event data ($H(ED_P)$) is received (316). For example, the $H(ED_P)$ is received from the shared memory, and is the hash of the event data, which was last appended to the audit log file. A previously determined second signature is received (318). For example, the previously determined second signature is received from the shared memory, and is the signature determined without the end marker for the event data, which was last appended to the audit log file. The previously appended first signature is overwritten with the previously determined second signature (320). That is, the first signature, determined based on the end marker, which was last appended to the audit log file is overwritten by the previously determined second signature (e.g., the previously appended first signature is deleted from the audit log file, and the previously determined second signature is appended to the audit log file).

A hash of the current event data ($H(ED_C)$) is determined (322). A first signature is determined based on the $H(ED_C)$, the $H(ED_P)$ and the end marker (322). For example, the first signature can be provided as an HMAC based on a concatenation of the $H(ED_P)$, the $H(ED_C)$ and the end marker. A second signature is determined based on the $H(ED_C)$ and the $H(ED_P)$ (326). For example, the second signature can be provided as an HMAC based on a concatenation of the $H(ED_P)$ and the $H(ED_C)$. The second signature and the $H(ED_C)$ are stored (312), and the current event data and the first signature are appended to the end of the audit log file (314).

Figure 4:
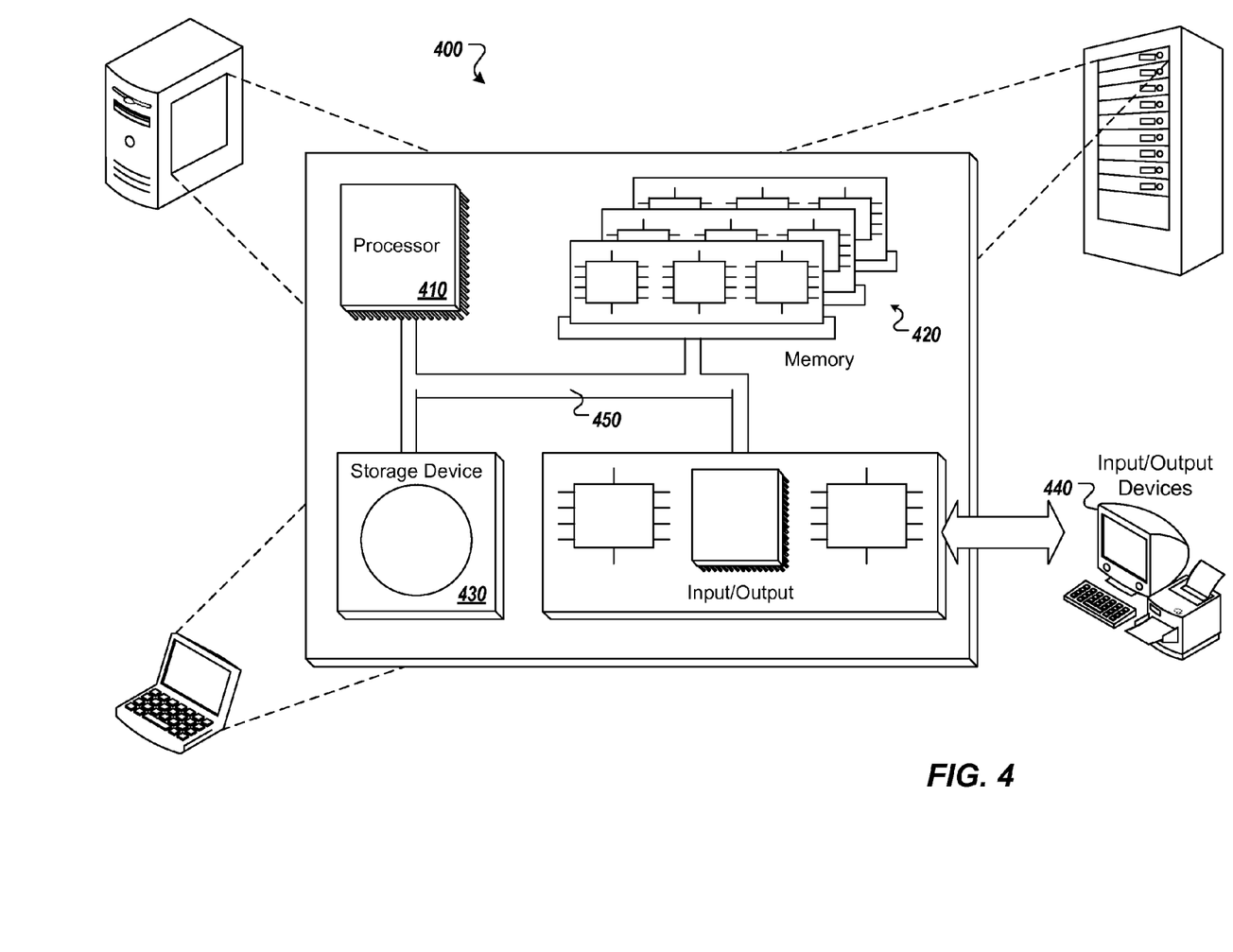
FIG. 4 is a schematic illustration of example computer systems that can be used to execute implementations of the present disclosure.

Referring now to FIG. 4, a schematic diagram of an example computing system 400 is provided. The system 400 can be used for the operations described in association with the implementations described herein. For example, the system 400 may be included in any or all of the server components discussed herein. The system 400 includes a processor 410, a memory 420, a storage device 430, and an input/output device 440. The components 410, 420, 430, 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit. The storage device 430 is capable of providing mass storage for the system 400. In one implementation, the storage device 430 is a computer-readable medium. In various different implementations, the storage device 430 may be a floppy disk device, a hard disk device, an optical disk device, or a tape device. The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for storing event data in an audit log file, the method being executed using one or more processors and comprising:
    receiving, by one or more processors, event data;
    determining, by the one or more processors, a first signature based on the event data and an end marker that is provided as a hard-coded string;
    determining, by one or more processors, a second signature based on the event data;
    transmitting, by the one or more processors, the second signature to a shared memory;
    appending, by the one or more processors, the event data and the first signature to the audit log file, the first signature comprising at least a portion of a signature chain associated with the audit log file;
    verifying, by the one or more processors, an integrity of the audit log file based on the event data and the first signature;
    receiving, by the one or more processors, second event data that is different from the event data;
    receiving, from the shared memory and by the one or more processors, the second signature; and
    overwriting, by the one or more processors, the first signature with the second signature in the audit log file.

2. The method of claim 1, wherein the first signature is provided as an authentication code.

3. The method of claim 1, wherein the first signature is further based on a hash of the event data and a random initialization vector.

4. The method of claim 1, wherein the first signature is further based on a hash of the event data and a hash of previously appended event data.

5. The method of claim 1, wherein the second signature is provided as an authentication code.

6. The method of claim 1, wherein the second signature is further based on a hash of the event data and a random initialization vector.

7. A non-transitory computer-readable storage medium coupled to one or more processors and having instructions stored thereon which, when executed by the one or more processors, cause the one or more processors to perform operations for storing event data in an audit log file, the operations comprising:
    receiving event data;
    determining a first signature based on the event data and an end marker that is provided as a hard-coded string;
    determining a second signature based on the event data;
    transmitting the second signature to a shared memory;
    appending the event data and the first signature to the audit log file, the first signature comprising at least a portion of a signature chain associated with the audit log file; and
    verifying an integrity of the audit log file based on the event data and the first signature;
    receiving second event data that is different from the event data;
    receiving, from the shared memory, the second signature; and
    overwriting the first signature with the second signature in the audit log file.

8. The computer-readable storage medium of claim 7, wherein the first signature is provided as an authentication code.

9. The computer-readable storage medium of claim 7, wherein the first signature is further based on a hash of the event data and a random initialization vector.

10. The computer-readable storage medium of claim 7, wherein the first signature is further based on a hash of the event data and a hash of previously appended event data.

11. The computer-readable storage medium of claim 7, wherein the second signature is provided as an authentication code.

12. The computer-readable storage medium of claim 7, wherein the second signature is further based on a hash of the event data and a random initialization vector.

13. A system, comprising:
    a computing device; and
    a computer-readable storage device coupled to the computing device and having instructions stored thereon which, when executed by the computing device, cause the computing device to perform operations for storing event data in an audit log file, the operations comprising:
    receiving event data;
    determining a first signature based on the event data and an end marker that is provided as a hard-coded string;
    determining a second signature based on the event data;
    transmitting the second signature to a shared memory;
    appending the event data and the first signature to the audit log file, the first signature comprising at least a portion of a signature chain associated with the audit log file; and verifying an integrity of the audit log file based on the event data and the first signature;

receiving second event data that is different from the event data;

receiving, from the shared memory, the second signature; and overwriting the first signature with the second signature in the audit log file.

14. The system of claim 13, wherein the first signature is provided as an authentication code.

15. The system of claim 13, wherein the first signature is further based on a hash of the event data and a random initialization vector.

16. The system of claim 13, wherein the first signature is further based on a hash of the event data and a hash of previously appended event data.

17. The system of claim 13, wherein the second signature is provided as an authentication code.

* * * * *